United States Patent [19]
Tanaka et al.

[11] Patent Number: 5,528,313
[45] Date of Patent: Jun. 18, 1996

[54] MOTION DETECTION CIRCUIT WHICH SUPPRESSES DETECTION SPREAD

[75] Inventors: Yutaka Tanaka, Kanagawa; Shigeo Fujishiro, Tokyo, both of Japan

[73] Assignee: Sony Corporation, Japan

[21] Appl. No.: 994,659

[22] Filed: Dec. 22, 1992

[30] Foreign Application Priority Data

Dec. 26, 1991 [JP] Japan .................................. 3-345121

[51] Int. Cl.$^6$ .................................................. H04N 7/24
[52] U.S. Cl. ........................................................... 348/699
[58] Field of Search ................................. 358/105, 138, 358/136, 133; 348/699, 424, 392, 451, 452, 390, 384; H04N 7/13

[56] References Cited

U.S. PATENT DOCUMENTS

| | | | |
|---|---|---|---|
| 4,760,446 | 7/1988 | Ninomiya et al. | 358/105 |
| 4,890,161 | 12/1989 | Kondo | 358/138 |
| 4,924,306 | 5/1990 | van der Meer et al. | 358/105 |
| 4,953,032 | 8/1990 | Suzaki et al. | 358/105 |
| 5,018,010 | 5/1991 | Masumoto | 358/105 |
| 5,126,843 | 6/1992 | Tanaka | 358/138 |
| 5,148,270 | 9/1992 | Someya | 358/105 |
| 5,173,771 | 12/1992 | Kitazato | 358/105 |

FOREIGN PATENT DOCUMENTS

0434290A1 6/1991 European Pat. Off. ......... H04N 5/14

OTHER PUBLICATIONS

Sokawa, Kenta et al, *ITEJ Technical Report*, vol. 12, No. 51, pp. 1-6, TEBS 88-37, Nov. 1988.

*Primary Examiner*—Tommy P. Chin
*Assistant Examiner*—Bryan S. Tung
*Attorney, Agent, or Firm*—Limbach & Limbach; Charles P. Sammut

[57] ABSTRACT

A motion detection signal delivered from a mixer is output through a series circuit of a maximum value calculation portion and a minimum value calculation portion. In each of the calculation portions, calculation is performed within a block of 3-dot×3-line. Missing of motion detection is prevented from occurring in the maximum value calculation portion because the motion detection signal of the pixel under attention is calculated therein with the values within the block and, accordingly, the motion detection signal is expanded in the horizontal and vertical directions. A detection spread to a still picture portion occurring in the calculation portion is suppressed in the minimum value calculation portion because, when surrounding motion detection signals therein are lower than the motion detection signal of the pixel under attention, the motion detection signal of the pixel under attention is replaced with the lower value. With the described arrangement, the missing of motion detection is advantageously prevented without inviting the detection spread to a still picture portion.

8 Claims, 6 Drawing Sheets

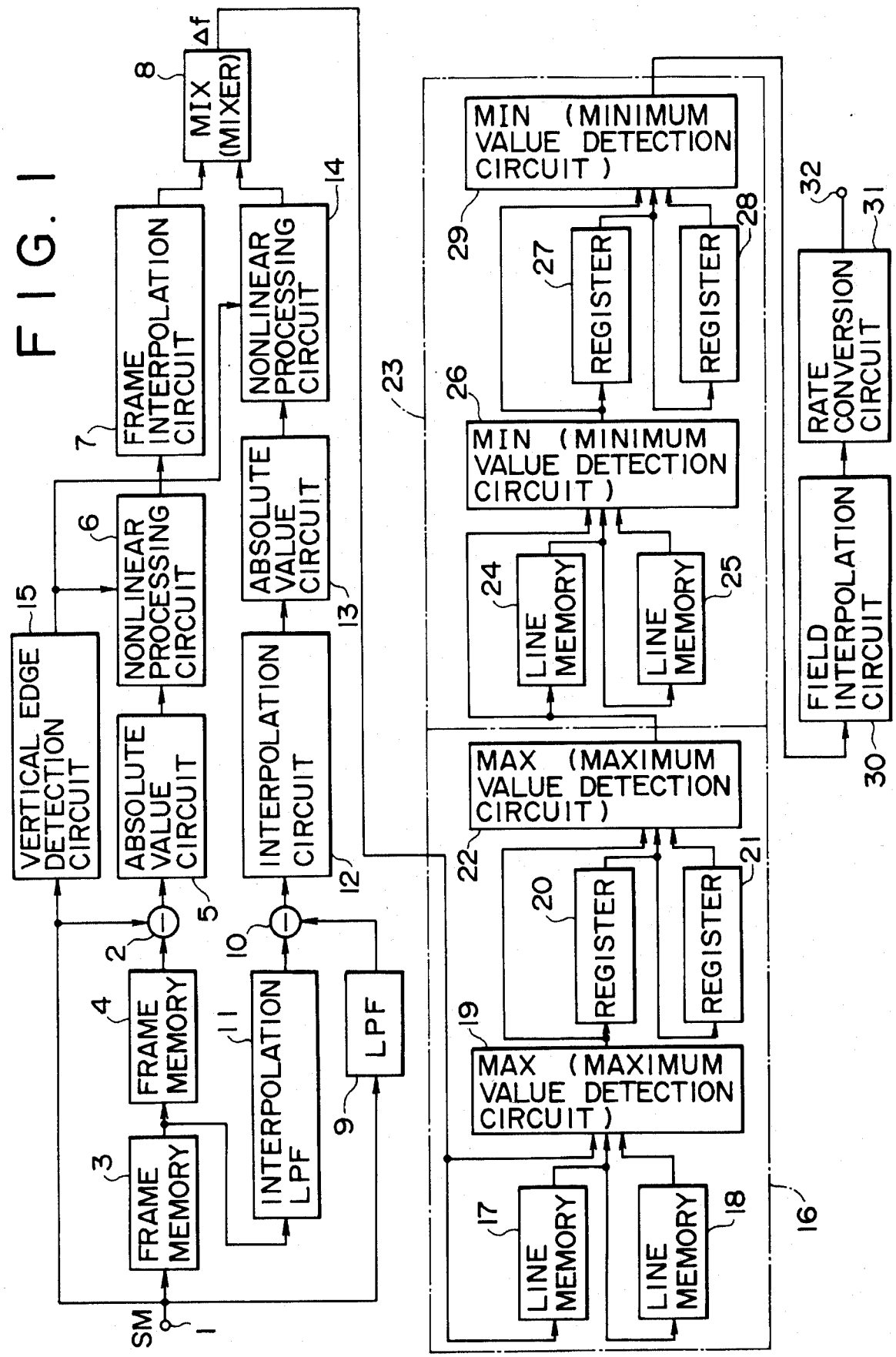

MOTION DETECTION CIRCUIT WHICH SUPPRESSES DETECTION SPREAD

BACKGROUND OF THE INVENTION

1. Field of the Invention

The present invention relates to a motion detection circuit for detecting motion from a television signal such as a MUSE signal.

2. Description of the Related Art

It is known that motion adaptive processes are performed in such circuits as Y/C separation circuits and non-interlace scanning converters. For example, interframe Y/C separation is performed for still pictures and interline Y/C separation is performed for moving pictures. Further, interfield scanning-line interpolation is performed for still pictures and interfield scanning-line interpolation is performed for moving pictures.

In order to perform such motion adaptive processes, it is required to detect motion from a television signal. FIG. 4 shows a prior art example of a motion detection circuit disclosed in ITEJ Technical Report Vol. 12, No. 51, PP. 1–6, TEBS 88-37 (November 1988).

Referring to FIG. 4, a television signal of NTSC system (NTSC signal) SV is input to an input terminal 41. While the NTSC signal SV is supplied to a subtractor 42 directly, it is supplied to the subtractor 42 also through a frame memory 43. The one-frame difference signal output from the subtractor 42 is supplied to a maximum value detection circuit 46 through a low-pass filter 44 and an absolute value circuit 45.

On the other hand, a color signal C (I signal, Q signal) is input to an input terminal 47. While the color signal C is supplied to a subtractor 48 directly, it is supplied to the same also through frame memories 49 and 50. The two-frame difference signal output from the subtractor 48 is supplied to the maximum value detection circuit 46 through a low-pass filter 51 and an absolute value circuit 52.

In the maximum value detection circuit 46, the maximum of the output signals of the absolute value circuits 45 and 52 is detected and it is supplied, as a motion information signal, to a coring circuit 53.

The NTSC signal SV input to the input terminal 41 is also supplied to a vertical edge detection circuit 58. The detection signal from the vertical edge detection circuit 58 is supplied to the coring circuit 53. In the coring circuit 53, a coring process (a process to vary the motion detection threshold value for preventing erroneous detection) is performed according to the magnitude of the vertical edge.

For example, when, as shown in FIG. 5A, there are an NTSC signal SV for a frame n (a signal before a shift indicated by the solid line) and an NTSC signal SV for a frame n+1 (a signal after a shift indicated by the broken line), the one-frame difference signal becomes as shown in FIG. 5B. As illustrated therein, the difference signal for the same shift amount becomes larger at the vertical edge portion. The same is true in the two-frame difference signal for the color signal C. Accordingly, the motion information signal for the same shift amount becomes larger at the vertical edge portion. Therefore, as described above, an adjustment is made in the coring circuit 53.

Referring back to FIG. 4, the motion detection signal output from the coring circuit 53 is supplied to an area filter 54. In the area filter 54, erroneously detected outputs which are produced incidentally from noises and the like are eliminated, taking it into consideration that motion of a picture occurs in a relatively large area. The area filter 54 is a kind of majority-decision circuit, in which the number of pixels in a block (m-dot×n-line) as shown in FIG. 6 which are decided to have been in motion are counted and the motion of a pixel under attention is judged by comparison of the count value with a preset threshold value.

For example, when a pixel under attention, which should have been in motion (solid circle), was detected and decided to have been at a standstill (open circle) due to noise or the like as shown in FIG. 7, it can be corrected to that in motion (solid circle) by a majority-decision process performed in the block for example of 3-dot×3-line (enclosed by the chain line).

The motion detection signal output from the area filter 54 is delivered to an output terminal 55 as a motion detection signal for Y/C separation. The motion detection signal output from the area filter 54 is also expanded in a temporal-spatial filter 56 in the directions of the horizontal, vertical, and time axes so as to prevent a motion to be detected from being missed, and then, it is delivered to an output terminal 57 as a motion detection signal for scanning conversion.

In the motion detection circuit of FIG. 4, the motion detection signal is expanded in the temporal-spatial filter 56 in the horizontal and vertical directions for preventing a motion to be detected from being missed. As a result, a detection spread to the still picture portion occurs and the picture quality is deteriorated.

For example, when the processing block of the filter 56 is 3-dot×3-line as shown in FIG. 8 (indicated by the chain line; the numerals attached are weighting factors), the motion detection signal of the pixel of the still picture (pixel under attention) located at the boundary between the area of still picture and the area of motion picture is effected by pixels in motion (solid circles) by insertion of the filter 56, though it should intrinsically be a pixel at a standstill (open circle).

Accordingly, it is intended in the present invention to prevent a motion to be detected from being missed without inviting the detection spread to the still picture portion.

An arrangement of the present invention is adapted therein such that a motion detection signal detected for each pixel is supplied to a maximum value calculation means performing calculation on the signal within a block of K-dot×L-line (K, L: natural numbers) and the output signal of the maximum value calculation means is supplied to a minimum value calculation means performing calculation on the signal within a block of M-dot×N-line (M, N: natural numbers), wherein the output signal of the minimum value calculation means is used as the motion detection signal of the arrangement.

By expanding a motion detection signal in the horizontal and vertical directions by making calculation in the maximum value calculation means within a block of K-dot×L-line, the missing of a motion to be detected is prevented. When a detection spread to a still picture portion occurs by performing the preventive process of the missing of a motion to be detected, the detection spread can be suppressed by making calculation on the signal in the minimum value calculation means within a block of M-dot×N-line.

BRIEF DESCRIPTION OF THE DRAWINGS

FIG. 1 is a block diagram showing a structure of an embodiment;

DESCRIPTION OF THE PREFERRED EMBODIMENTS

Figure 2A:
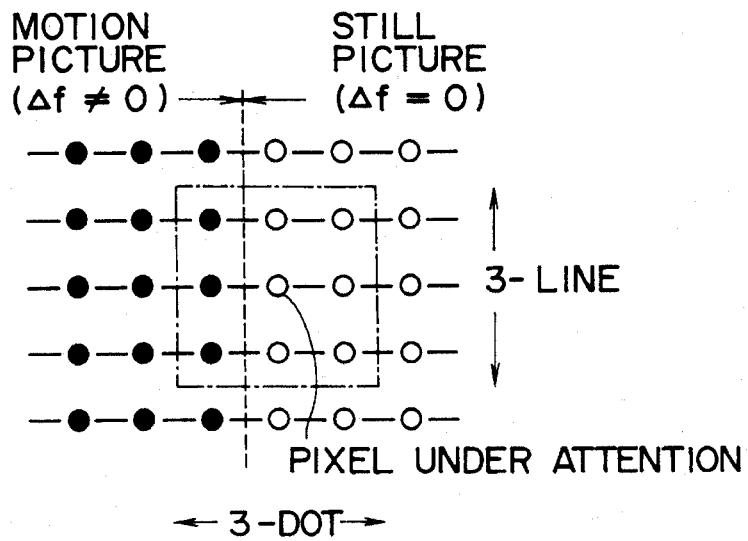
FIGS. 2A, 2B and 2C are diagrams for explaining operation of a maximum value calculation portion and a minimum value calculation portion.

An embodiment of the present invention will be described below with reference to FIG. 1. This example is such that has the present invention applied to a motion detection circuit in a luminance signal system of a MUSE decoder.

As is well known, the MUSE (Multiple Sub-Nyquist Sampling Encoding) system is a sampling value transmission system in which only one pixel out of four pixels in interfield or interframe offset sampling is transmitted. The sampling pattern is not varied with pictures but fixed (fixed-density sampling) and the data is thereby compressed to ¼.

In the decoder on the reception side, the picture of still picture is reproduced with the data of four fields to obtain high resolution and the picture of motion picture is reproduced with the data of one field to prevent occurrence of picture displacement. Accordingly, motion detection becomes necessary in the MUSE decoder.

Referring to FIG. 1, a MUSE signal SM at a sampling frequency of 16.2 MHz is input to an input terminal 1. While the MUSE signal SM is supplied to a subtractor 2 directly, the MUSE signal SM passed through frame memories 3 and 4, hence being of two frames before, is also supplied to the subtractor 2.

From the two-frame difference signal output from the subtractor 2, its absolute value is obtained in an absolute value circuit 5. From the absolute value, a motion detection sensitivity is set up by a nonlinear processing circuit 6 and it is supplied to a frame interpolation circuit 7. In the frame interpolation circuit 7, a motion detection signal for two-frame period at the rate of 32.4 MHz is generated, and this motion detection signal is supplied to a mixer 8. The MUSE signal SM input to the input terminal 1 is further supplied to a subtractor 10 through a low-pass filter 9, and the MUSE signal SM of one frame before output from the frame memory 3 is also supplied to the subtractor 10 through an interpolation low-pass filter 11. The signals passed through the low-pass filters 9 and 11 are limited for their frequency bands to less than 4 MHz.

The one-frame difference signal output from the subtractor 10 is supplied to an interpolation circuit 12 and, therein, the one-frame difference signal at the rate of 32.4 MHz is generated. From the one-frame signal, its absolute value is obtained in an absolute value circuit 13, and from which, a motion detection sensitivity is set up by a nonlinear processing circuit 14 and it is supplied to the mixer 8 as a motion detection signal for one-frame period.

The MUSE signal SM input to the input terminal 1 is further supplied to a vertical edge detection circuit 15. The detection signal from the vertical edge detection circuit 15 is supplied to the nonlinear processing circuits 6 and 14, wherein adjustments for the interframe difference signals becoming larger at the vertical edge portion for the same amount of motion are made.

In the mixer 8, the motion detection signal for two-frame period supplied from the frame interpolation circuit 7 and the motion detection signal for one-frame period supplied from the nonlinear processing circuit 14 are mixed and a motion detection signal $\Delta f$ is generated. The reason why the motion detection signals for two-frame period and one-frame period are combined is as follows.

The difference in luminance between a signal in the current frame and a signal one frame before is, as apparent from the well known sampling pattern of the MUSE signal, not the difference in luminance between two pixels in the same position but that between a pixel in the sampling pattern of the current frame and a pixel in the next position. On the other hand, the difference in luminance between a signal in the current frame and a signal two frames before includes alias components and further the signals are temporally apart. Therefore, despite that the pixels are those in the same position, such things that some portions in motion are dropped occur and, hence, portions in motion cannot be detected correctly.

Accordingly, by obtaining the motion detection signal $\Delta f$, as described above, by mixing the motion detection signal generated from the change in luminance during the one-frame period including no alias component, of 0 to 4 mHz components, and the motion detection signal generated from the change in luminance during the two-frame period, the defects in both of the signals can be remedied.

The motion detection signal $\Delta f$ output from the mixer 8 is supplied to a maximum value calculation portion 16 for making calculation within a block of 3-dot×3-line.

More specifically, the motion detection signal $\Delta f$ output from the mixer 8 is supplied to a series circuit of line memories 17 and 18 and, thereby, signals of one line before and two lines before are generated. These signals and the signal of the current line are supplied to a maximum value detection circuit 19 and the maximum value is detected therein.

The signal output from the maximum value detection circuit 19 is supplied to a series circuit of registers 20 and 21 and, thereby, signals of one dot before and two dots before are generated. These signals and the signal of the current dot are supplied to a maximum value detection circuit 22 and the maximum value is detected therein. The output signal of the maximum value detection circuit 22 is output as the output signal of the maximum value calculation portion 16.

The signal output from the maximum value calculation portion 16 is supplied to a minimum value calculation portion 23 for making calculation within a block of 3-dot× 3-line.

More specifically, the signal from the maximum value calculation portion 16 is supplied to a series circuit of line memories 24 and 25 and signals of one line before and two lines before are generated therein. These signals and the signal of the current line are supplied to a minimum value detection circuit 26 and the minimum value is detected therein.

The signal output from the minimum value detection circuit 26 is supplied to a series circuit of registers 27 and 28 and signals of one dot before and two dots before are generated therein. These signals and the signal of the current dot are supplied to a minimum value detection circuit 29 and the minimum value is detected therein. The output signal of the minimum value detection circuit 29 is output as the output signal of the minimum value calculation portion 23.

The motion detection signal output from the minimum value calculation portion 23 is supplied to a field interpolation circuit 30 and interpolated therein for the time base and, thereafter, supplied to a rate conversion circuit 31 and the rate is converted therein from 32.4 MHz to 48.6 MHz. The motion detection signal at the rate of 48.6 MHz output from the rate conversion circuit 31 is delivered to the output terminal 32.

In the present example, since the motion detection signal of the pixel under attention is calculated with the values in the block of 3-dot×3-line in the maximum value calculation portion 16, the motion detection signal is expanded in the horizontal and vertical directions and, thereby, a motion to be detected is prevented from being missed. However, by performing the preventive process of the missing of motion detection, there arises the possibility that the detection spread to the still picture portion occurs.

We suppose that, for example, a motion detection signal Δf as shown in FIG. 2A at the boundary between the motion picture and the still picture is obtained from the mixer 8. Referring to the figure, solid circles and open circles represent motion detection signals of dots, Δf≠0 corresponding to the solid circles and Δf=0 corresponding to the open circles.

Figure 2B:
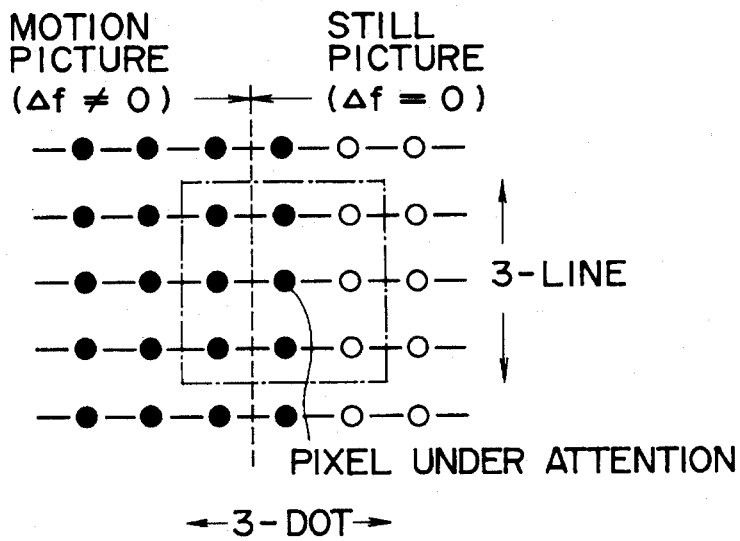

When calculation on the motion detection signal of a pixel under attention in the still picture is performed in the maximum value detection circuit 16 within a 3-dot×3-line block (indicated by the chain line in FIG. 2A), the motion detection signal of the pixel under attention is effected by the detection signals in the motion picture portion and becomes Δf≠0 (solid circle) as shown in FIG. 2B, namely, a detection spread occurs.

However, when the surrounding motion detection signals are lower than the motion detection signal of the pixel under attention in the minimum value calculation portion 23, the motion detection signal of the pixel under attention is replaced with the lower value in the surrounding. Therefore, the detection spread to the still picture portion produced in the maximum value calculation portion 16 as described above is suppressed.

Figure 2C:
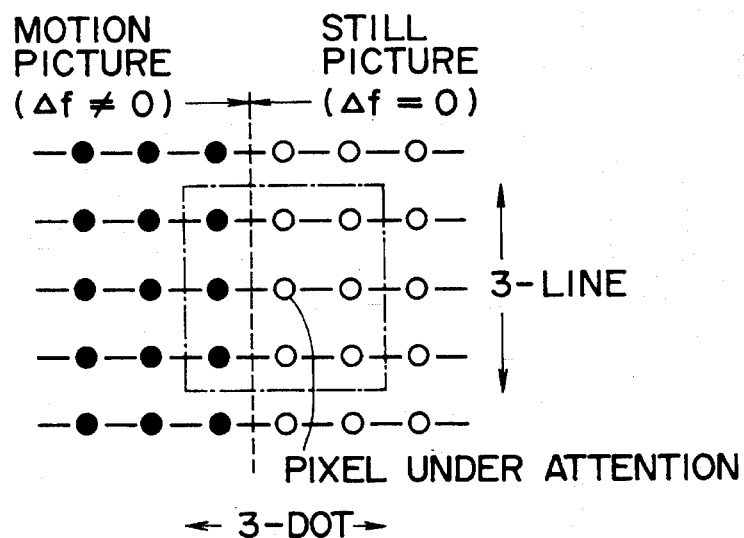

More specifically, when the pixel under attention in the still picture portion to which the detection spread has extended is subjected to calculation in the minimum value calculation portion 23 within the 3-dot×3-line block (indicated by the chain line in FIG. 2B), the motion detection signal of the pixel under attention is restored to Δf=0 (open circle) as shown in FIG. 2C. Thus, the detection spread is suppressed.

According to the present example, as described above, by outputting the motion detection signal Δf through the maximum value calculation portion 16 and the minimum value calculation portion 23, the missing of motion detection is advantageously prevented without inviting the detection spread to the still picture portion.

Figure 3:
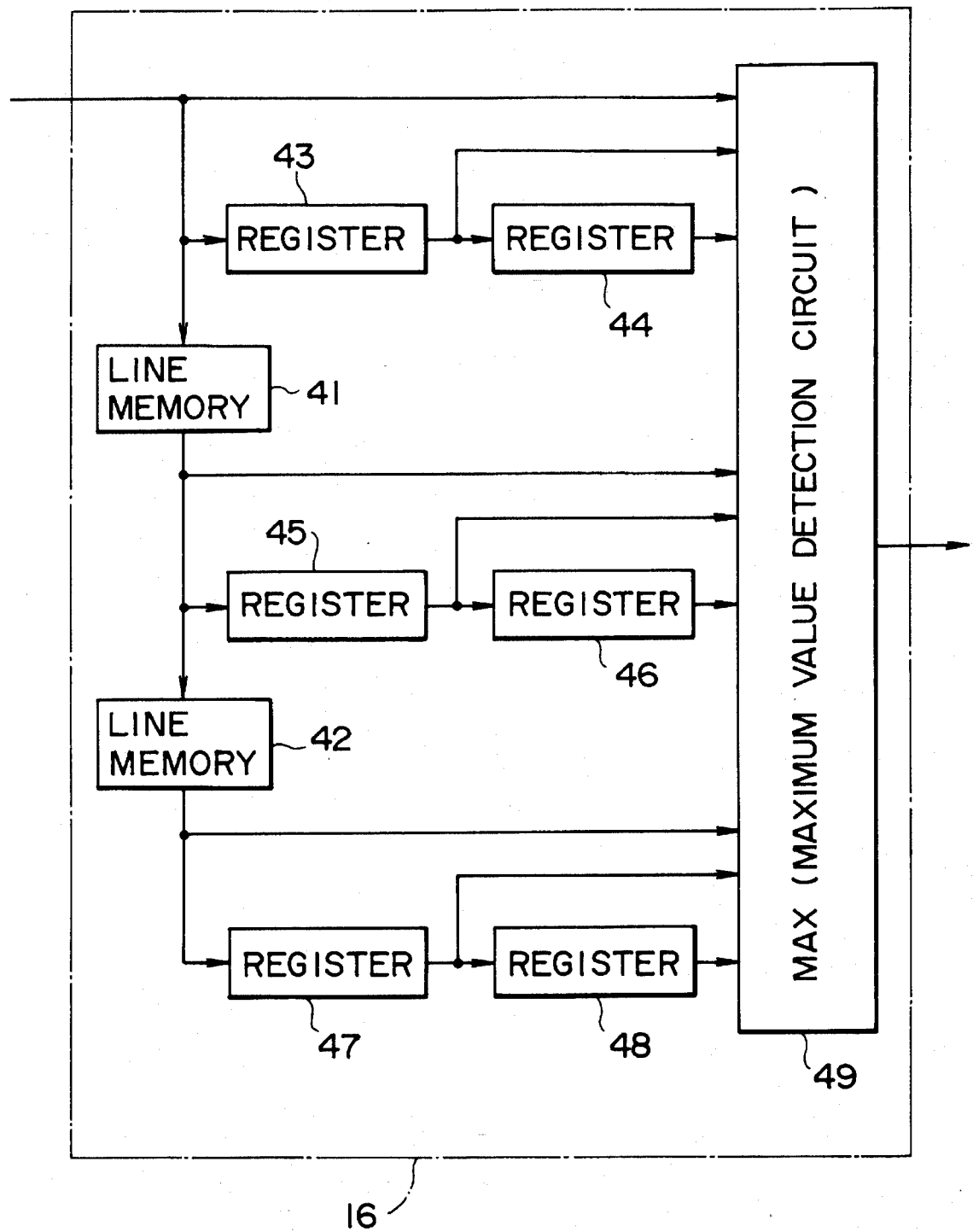
FIG. 3 is a diagram showing another structure of the maximum value calculation portion.
Figure 4:
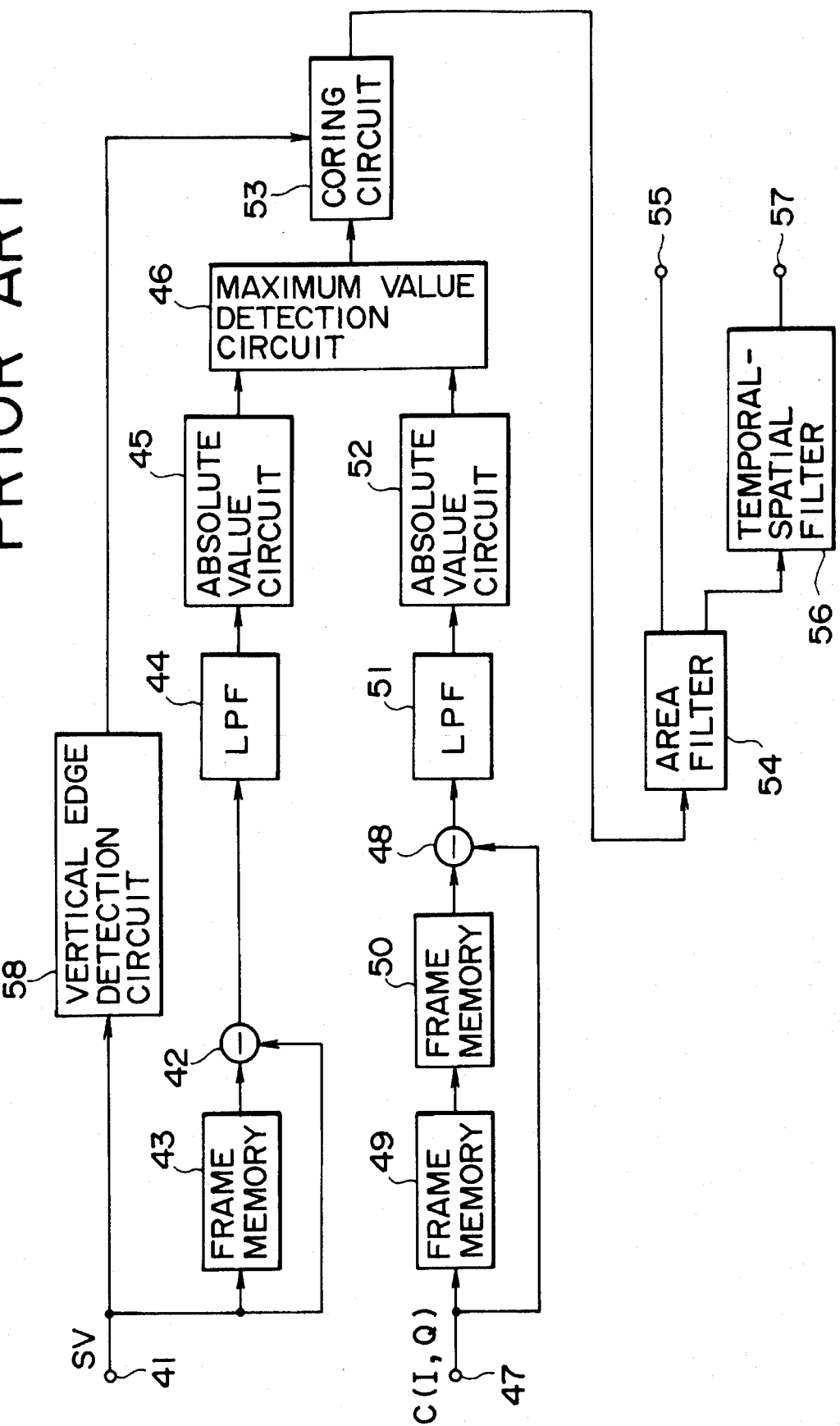
FIG. 4 is a block diagram showing a prior art example of a motion detection circuit.
Figure 5A:
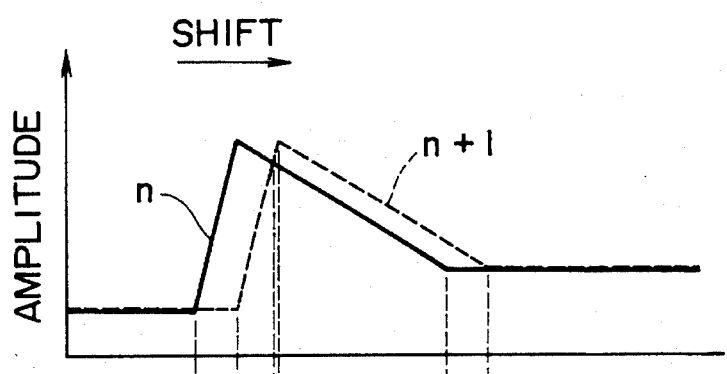
FIGS. 5A and 5B are diagrams for explaining a coring circuit.
Figure 5B:
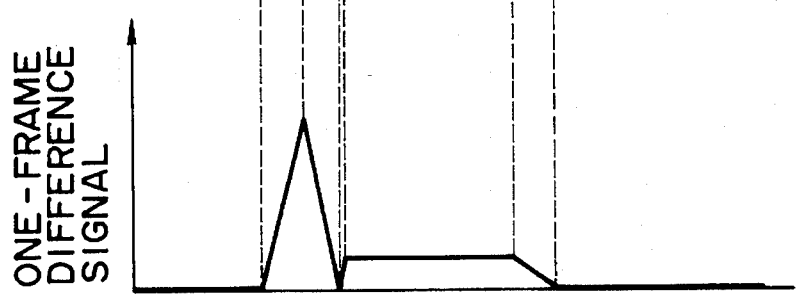
Figure 6:
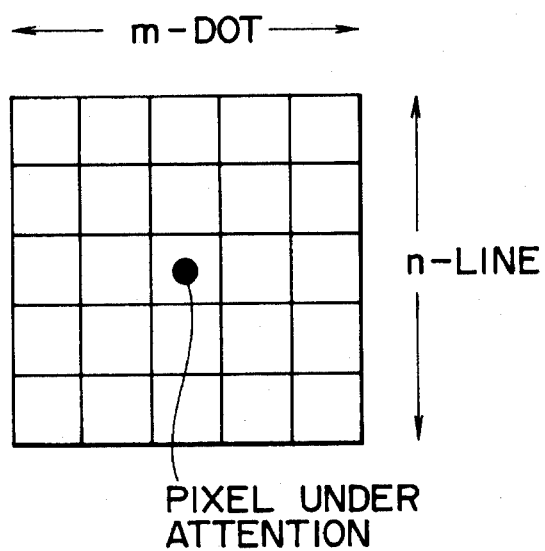
FIG. 6 is a diagram for explaining an area filter.
Figure 7:
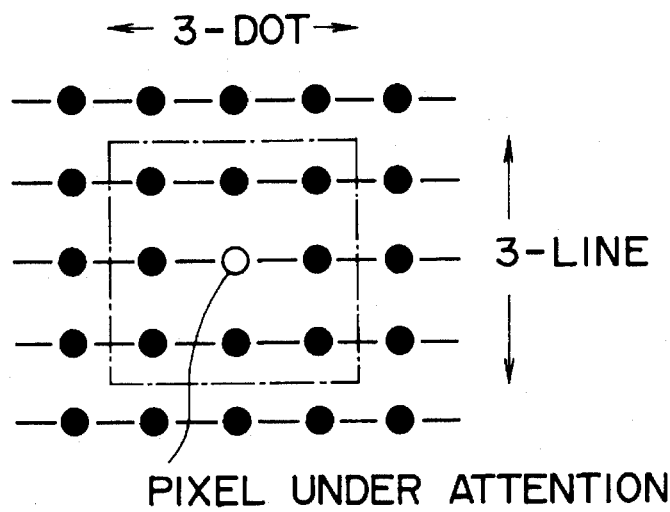
FIG. 7 is a diagram for explaining effect of an area filter.
Figure 8:
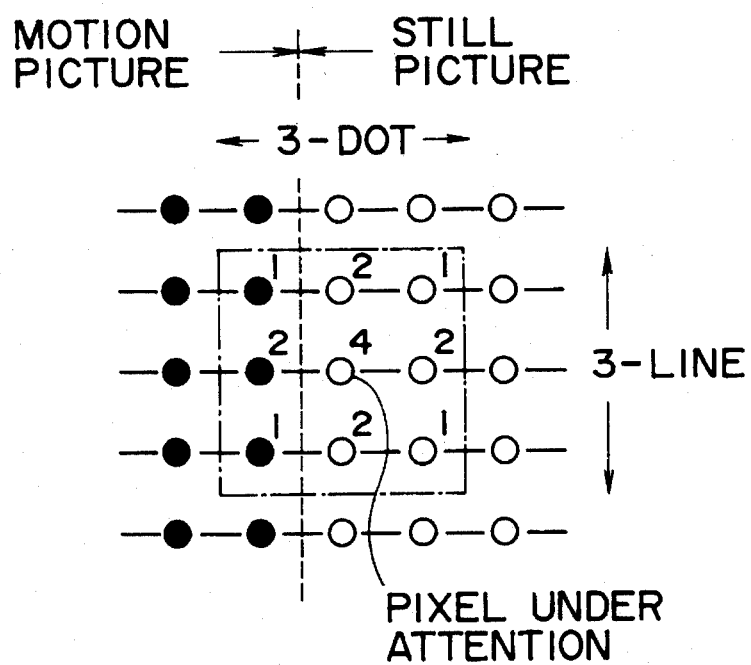
FIG. 8 is a diagram for explaining a detection spread to a still picture portion.

The maximum value calculation portion 16 can also be arranged as shown in FIG. 3. Referring to FIG. 3, reference numerals 41 and 42 denote line memories each thereof being for delaying a one-line period, 43 to 48 denote registers each thereof being for delaying a one-dot period, and 49 denotes a maximum value detection circuit for detecting the maximum value. The same operations as in the maximum value calculation portion in the embodiment of FIG. 1 are performed in the maximum value calculation portion 16 shown in FIG. 3. The minimum value calculation portion 23 can also be arranged the same as the maximum value calculation portion 16 shown in FIG. 3, in which case, a minimum value detection circuit should be arranged in place of the maximum value detection circuit 49 in FIG. 3.

In the above described embodiment, though the maximum value calculation portion 16 and the minimum value calculation portion 23 are adapted to make calculation within a 3-dot×3-line block, the size of the block is not limited to that. Further, the blocks set in both of the calculation portions 16 and 23 need not be of the same size.

Although the above described embodiment has been that applied to the motion detection circuit in the luminance signal system of MUSE decoders, it can also be applied to motion detection circuits, for example, for IDTV and EDTV receivers.

According to the present invention, the missing of motion detection is prevented by performing calculation in a maximum value detection means within a K-dot×L-line block. Further, the detection spread to a still picture portion caused by performing the preventive process of the missing of motion detection can be suppressed by performing calculation in a minimum value calculation portion within an M-dot×N-line block. Therefore, the missing of motion detection is advantageously prevented without inviting the detection spread to the still picture portion.

What is claimed is:

1. A motion detection circuit for detecting the motion of a video picture signal, comprising:

maximum value calculation means for calculating the maximum value in a block of said video picture signal of K-line×L-dot, where K and L are natural numbers, the block of K-line×L-dot including a pixel under attention in accordance with first motion detection signals detected for pixels of said video picture signal, wherein said maximum value calculation means include first delay means for delaying a first motion detection signal such that outputs thereof are successively delayed by one line, first maximum value detection means for detecting a first maximum value from the outputs of said first delay means, second delay means for delaying the output of said first maximum value detection means such that outputs thereof are successively delayed by one dot and second maximum value detection means for detecting a second maximum value from the outputs of said second delay means; and minimum value calculation means for calculating the minimum value in a block of said video picture signal of M-line×N-dot, where M and N are natural numbers, the block of M-line×N-dot including said pixel under attention in accordance with the outputs of said maximum value calculation means and for outputting said minimum value as a second detection signal of said pixel under attention.

2. A motion detection circuit for detecting the motion of a video picture signal, comprising:

maximum value calculation means for calculating the maximum value in a block of said video picture signal of K-line×L-dot, where K and L are natural numbers, the block of K-line×L-dot including a pixel under attention in accordance with first motion detection signals detected for pixels of said video picture signal; and minimum value calculation means for calculating the minimum value in a block of said video picture signal of M-line×N-dot, where M and N are natural numbers, the block of M-line×N-dot including said pixel under attention in accordance with the outputs of said maximum value calculation means and for outputting said minimum value as a second detection signal of said pixel under attention, wherein said minimum value calculation means include first delay means for delaying the output of said maximum value calculation means such that outputs thereof are successively delayed by one line, first minimum value detection means for detecting a first minimum value from the outputs of said first delay means, second delay means for delaying the output of said first minimum value detection means such that outputs thereof are successively delayed by one dot and second minimum value detection means for detecting a second minimum value from the outputs of said second delay means.

3. A motion detection circuit for detecting the motion of a video picture signal, comprising:

maximum value calculation means for calculating the maximum value in a block of said video picture signal of K-line×L-dot, where K and L are natural numbers, the block of K-line×L-dot including a pixel under attention in accordance with first motion detection signals detected for pixels of said video picture signal, wherein said maximum value calculation means include maximum value detection means for detecting a maximum value from input signals thereto and delay means for delaying said first motion detection signals corresponding to pixels within the block of K-line×L-dot, where K and L are natural numbers, such that said first motion detection signals are input to said maximum value detection means at the same time; and minimum value calculation means for calculating the minimum value in a block of said video picture signal of M-line×N-dot, where M and N are natural numbers, the block of M-line×N-dot including said pixel under attention in accordance with the outputs of said maximum value calculation means and for outputting said minimum value as a second detection signal of said pixel under attention.

4. A motion detection circuit for detecting the motion of a video picture signal, comprising:

maximum value calculation means for calculating the maximum value in a block of said video picture signal of K-line×L-dot, where K and L are natural numbers, the block of K-line×L-dot including a pixel under attention in accordance with first motion detection signals detected for pixels of said video picture signal; and minimum value calculation means for calculating the minimum value in a block of said video picture signal of M-line×N-dot, where M and N are natural numbers, the block of M-line×N-dot including said pixel under attention in accordance with the outputs of said maximum value calculation means and for outputting said minimum value as a second detection signal of said pixel under attention, wherein said minimum value calculation means include minimum value detection means for detecting a minimum value from input signals thereto and delay means for delaying outputs of said maximum value calculation means corresponding to pixels within the block of M-line×N-dot, where M and N are natural numbers, such that said outputs of said maximum value calculation means are input to said minimum value detection means at the same time.

5. A motion detection circuit according to claim 1, wherein said minimum value calculation means includes:

first delay means for delaying the output of said maximum value calculation means such that outputs thereof are successively delayed by one line;

first minimum value detection means for detecting a first minimum value from the outputs of said first delay means;

second delay means for delaying the output of said first minimum value detection means such that outputs thereof are successively delayed by one dot; and second minimum value detection means for detecting a second minimum value from the outputs of said second delay means.

6. A motion detection circuit according to claim 1, wherein said minimum value calculation means includes:

minimum value detection means for detecting a minimum value from input signals thereto; and delay means for delaying outputs of said maximum value calculation means corresponding to pixels within the block of M-line×N-dot, where M and N are natural numbers such that said outputs of said maximum value calculation means are input to said minimum value detection means at the same time.

7. A motion detection circuit according to claim 2, wherein said maximum value calculation means includes:

maximum value detection means for detecting a maximum value from input signals thereto; and delay means for delaying said first motion detection signals corresponding to pixels within the block of K-line×L-dot, where K and L are natural numbers, such that said first motion detection signals are input to said maximum value detection means at the same time.

8. A motion detection circuit according to claim 3, wherein said minimum value calculation means includes:

minimum value detection means for detecting a minimum value from input signals thereto; and delay means for delaying outputs of said maximum value calculation means corresponding to pixels within the block of M-line×N-dot, where M and N are natural numbers, such that said outputs of said maximum value calculation means are input to said minimum value detection means at the same time.

\* \* \* \* \*